(12) United States Patent
Lim et al.

(10) Patent No.: US 11,668,859 B2
(45) Date of Patent: Jun. 6, 2023

(54) OPTICAL FILM HAVING EXCELLENT ADHESIVE STRENGTH AND DURABILITY, AND POLARIZING FILM COMPRISING SAME

(71) Applicant: ANHUI HEMEI MATERIALS TECHNOLOGY CO., LTD., Hefei (CN)

(72) Inventors: Yirang Lim, Daejeon (KR); Kyoung Won Kim, Daejeon (KR); Sungin Kim, Daejeon (KR); Jun Wuk Park, Daejeon (KR)

(73) Assignee: ANHUI HEMEI MATERIALS TECHNOLOGY CO., LTD., Hefei (CN)

( * ) Notice: Subject to any disclaimer, the term of this patent is extended or adjusted under 35 U.S.C. 154(b) by 162 days.

(21) Appl. No.: 16/326,146

(22) PCT Filed: Aug. 17, 2017

(86) PCT No.: PCT/KR2017/008963
§ 371 (c)(1),
(2) Date: Feb. 15, 2019

(87) PCT Pub. No.: WO2018/034512
PCT Pub. Date: Feb. 22, 2018

(65) Prior Publication Data
US 2019/0179058 A1 Jun. 13, 2019

(30) Foreign Application Priority Data
Aug. 17, 2016 (KR) .................. 10-2016-0104480

(51) Int. Cl.
| G02B 1/14 | (2015.01) |
| G02B 1/04 | (2006.01) |
| G02B 5/30 | (2006.01) |
| C09D 167/02 | (2006.01) |
| G02B 5/22 | (2006.01) |
| C08J 7/04 | (2020.01) |
| C08J 7/043 | (2020.01) |
| C08J 7/046 | (2020.01) |
| C09D 7/61 | (2018.01) |
| C09D 5/00 | (2006.01) |
| C09D 151/08 | (2006.01) |

(52) U.S. Cl.
CPC .............. *G02B 1/14* (2015.01); *C08J 7/043* (2020.01); *C08J 7/046* (2020.01); *C08J 7/0427* (2020.01); *C09D 5/00* (2013.01); *C09D 7/61* (2018.01); *C09D 151/08* (2013.01); *C09D 167/02* (2013.01); *C09D 167/025* (2013.01); *G02B 1/04* (2013.01); *G02B 5/22* (2013.01); *G02B 5/30* (2013.01); *C08J 2333/00* (2013.01); *C08J 2451/08* (2013.01); *C08J 2467/02* (2013.01); *C08J 2475/12* (2013.01)

(58) Field of Classification Search
CPC ... G02B 1/14; G02B 1/04; G02B 5/30; C09D 7/61; C09D 5/00; C09D 151/08; C09D 167/02; C09D 167/025; C08J 7/0427; C08J 2333/00; C08J 2451/08; C08J 2467/02; C08J 2475/12; C02B 5/22
USPC ..................................... 428/423.1
See application file for complete search history.

(56) References Cited

U.S. PATENT DOCUMENTS

| 6,926,945 | B2 | 8/2005 | Yano et al. |
| 9,448,347 | B2 | 9/2016 | Shim et al. |
| 2010/0182690 | A1 | 7/2010 | Takao et al. |
| 2012/0264858 | A1* | 10/2012 | Hintze-Bruning ... C09D 175/06 524/159 |
| 2014/0134368 | A1 | 5/2014 | Domes et al. |
| 2014/0333999 | A1 | 11/2014 | Shim et al. |
| 2014/0371387 | A1 | 12/2014 | Tielemans |
| 2015/0160378 | A1* | 6/2015 | Lim ..................... G02B 5/3033 428/336 |
| 2016/0231484 | A1* | 8/2016 | Shim .................. G02B 5/305 |
| 2016/0237284 | A1* | 8/2016 | Shim .................. C08J 7/043 |
| 2017/0101517 | A1 | 4/2017 | Lim et al. |

FOREIGN PATENT DOCUMENTS

| JP | 2003119305 A | 4/2003 |
| JP | 2009-227753 A | 10/2009 |
| JP | 2010-204622 A | 9/2010 |
| JP | 2016-522912 A | 8/2016 |
| KR | 1020090125175 A | 12/2009 |
| KR | 1020100038413 A | 4/2010 |
| KR | 1020110080414 A | 7/2011 |
| KR | 1020120047536 A | 5/2012 |
| KR | 101265311 B1 | 5/2013 |
| KR | 101389346 B1 | 5/2014 |
| KR | 101408712 B1 | 6/2014 |
| KR | 1020140087796 A | 7/2014 |
| KR | 20150037596 A * | 4/2015 ............... B32B 7/02 |

(Continued)

OTHER PUBLICATIONS

Machine translation of WO 2016/067825 A1 (Year: 2016).*

*Primary Examiner* — Callie E Shosho
*Assistant Examiner* — Steven A Rice
(74) *Attorney, Agent, or Firm* — Cheng-Ju Chiang

(57) ABSTRACT

The present specification relates to an optical film including a transparent film, and a coating layer on at least one surface of the transparent film, wherein the coating layer includes a polyester-based resin and a polyurethane-based resin, and is formed using a composition having a minimum film-forming temperature difference of 40° C. to 110° C. between the polyester-based resin and the polyurethane-based resin, and a polarizing plate including the same.

5 Claims, No Drawings

(56) References Cited

FOREIGN PATENT DOCUMENTS

| | | |
|---|---|---|
| KR | 1020160034831 A | 3/2016 |
| KR | 1020160075855 A | 6/2016 |
| WO | WO-2016067825 A1 * 5/2016 | ............. C08G 18/66 |

* cited by examiner

OPTICAL FILM HAVING EXCELLENT ADHESIVE STRENGTH AND DURABILITY, AND POLARIZING FILM COMPRISING SAME

TECHNICAL FIELD

This application is a National Stage Application of International Application No. PCT/KR2017/008963 filed on Aug. 17, 2017, which claims priority to and the benefits of Korean Patent Application No. 10-2016-0104480, filed with the Korean Intellectual Property Office on Aug. 17, 2016, the entire contents of which are incorporated herein by reference.

The present specification relates to an optical film having excellent adhesive strength and durability, and a polarizing plate including the same.

BACKGROUND ART

Polarizing plates have been commonly used in a structure of a protective film being laminated on one surface or both surfaces of a polarizer formed with a polyvinyl alcohol (hereinafter, referred to as 'PVA')-based resin dyed with dichroic dye or iodine using an adhesive. Triacetyl cellulose (TAC)-based films have been normally used as a polarizing plate protective film in the art, however, such TAC films have a problem of being readily deformed under high temperature and high humidity environments. Accordingly, protective films made of various materials capable of replacing TAC films have been recently developed, and for example, a method of using polyethylene terephthalate (PET), a cycloolefin polymer (COP) or the like either alone or as a mixture thereof has been proposed.

However, as various polarizing plate models are increasingly developed, necessity of applying an optical film used therein to the various polarizing plate models, and there is a problem in that, since film surfaces of the above-mentioned films have nonpolar properties, adhesive strength is not sufficiently secured when using an aqueous adhesive used for attaching a polarizer and a protective film in the art. In addition, in polyvinyl alcohol-based adhesives mainly used as the aqueous adhesive, a polyvinyl alcohol-based resin that is a main component is a water-soluble polymer, and peel-off occasionally occurs at an interface between a polarizer and a protective film under a humidity condition. In order to resolve such a problem, a method of using a non-aqueous adhesive has been proposed, however, adhesive layer coating is difficult since a non-aqueous adhesive has high surface frictional force and poor resistance for organic solvents, and when using an adhesive including an organic solvent, problems such as damaging a film surface occur.

In addition, durability such as high temperature, high humidity or water resistance becomes important for an optical film since maintaining its property while going through various processes after being prepared into a polarizing plate is important. Accordingly, development of an optical film having excellent durability as well as adhesive strength with a polarizer has been required.

DISCLOSURE

Technical Problem

The present specification is directed to providing an optical film having excellent adhesive strength and durability, and a polarizing plate including the same.

Technical Solution

One embodiment of the present specification provides an optical film including a transparent film; and a coating layer on at least one surface of the transparent film, wherein the coating layer includes a polyester-based resin and a polyurethane-based resin, and is formed using a composition having a minimum film-forming temperature difference of 40° C. to 110° C. between the polyester-based resin and the polyurethane-based resin.

Another embodiment of the present specification provides a polarizing plate including a polarizer and the optical film according to the present specification on at least one surface of the polarizer.

Advantageous Effects

An optical film according to one embodiment of the present specification has excellent adhesive strength with various adhesives regardless of adhesive types, that is, types such as an aqueous drying-type or an ultraviolet curing-type, and has excellent adhesive strength and durability even after high temperature and high humidity polarizing plate durability tests, and therefore, adhesion with a polarizer readily occurs.

MODE FOR DISCLOSURE

Hereinafter, preferred embodiments of the present specification will be described. However, embodiments of the present specification may be modified to various different forms, and the scope of the present specification is not limited to the embodiments described below. In addition, embodiments of the present specification are provided in order to more fully describe the present specification to those having average knowledge in the art.

Hereinafter, the present specification will be described in more detail.

According to one embodiment of the present specification, an optical film of the present specification includes a transparent film, and a coating layer on at least one surface of the transparent film, wherein the coating layer includes a polyester-based resin and a polyurethane-based resin, and may be formed using a composition having a minimum film-forming temperature difference of 40° C. to 110° C. between the polyester-based resin and the polyurethane-based resin.

The minimum film-forming temperature refers to a minimum temperature at which a coating solution, a dispersion solution, an adhesive, a paint and the like are uniformly combined when applied on a base surface of a thin film. In other words, a transparent film or coating with no empty space inside may be formed at a minimum film-forming temperature or higher. When the temperature does not reach a minimum film-forming temperature, the film or coating may be opaque or has cracks, or a powder phase may be formed on the film or coating surface.

The minimum film-forming temperature is measured using a minimum film-forming temperature measuring device, and specifically, may be measured in the manner of forming a coating layer or a film by applying a coating solution on a flat plate having a temperature gradient, and then checking a temperature at which a transparent film is formed.

In addition, according to one embodiment of the present specification, the composition may include the polyester-based resin in 70 parts by weight to 95 parts by weight and the polyurethane-based resin in 5 parts by weight to 30 parts by weight with respect to a total of 100 parts by weight.

In addition, according to one embodiment of the present specification, the minimum film-forming temperatures of the polyester-based resin and the polyurethane-based resin are from 80° C. to 110° C. and from 0° C. to 40° C., respectively.

In the present specification, the polyester-based resin means a resin including an ester group formed through a reaction between a carboxylic acid and an alcohol on the main chain, may preferably be a water-dispersible polyester resin, and more preferably includes polyester glycol formed through a reaction between a polybasic acid and a polyol.

Herein, examples of the polybasic acid component may include aromatic dicarboxylic acids such as ortho-phthalic acid, isophthalic acid, terephthalic acid, 1,4-naphthalenedicarboxylic acid, 2,5-naphthalenedicarboxylic acid, 2,6-naphthalenedicarboxylic acid, biphenyldicarboxylic acid or tetrahydrophthalic acid; aliphatic dicarboxylic acids such as oxalic acid, succinic acid, malonic acid, glutaric acid, adipic acid, pimellic acid, suberic acid, azelaic acid, sebacic acid, linoleic acid, maleic acid, fumaric acid, mesaconic acid or itaconic acid; alicyclic dicarboxylic acids such as hexahydrophthalic acid, tetrahydrophthalic acid, 1,3-cyclohexanedicarboxylic acid or 1,4-cyclohexanedicarboxylic acid; or reactive derivatives such as acid anhydrides, alkyl esters or acids halides thereof, but are not limited thereto, and may include one, two or more types selected from the group consisting of these. Among these, terephthalic acid, isophthalic acid, succinic acid and the like are particularly preferred. In addition, using sulfonate-substituted isophthalic acid as a basic acid is particularly preferred in terms of water dispersibility.

The polyol is not particularly limited as long as it has two or more hydroxyl groups in the molecule, and examples of the polyol preferably include one or more types selected from the group consisting of ethylene glycol, 1,2-propanonediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose and sorbitol. Including one, two or more types selected from the group consisting of a carboxyl group-containing dimethylol alkanoic acid, dimethylol acetic acid, dimethylol propionic acid and dimethylol methylbutyric acid as the polyol is particularly preferred in terms of water dispersibility.

The polyester glycol is preferably formed by reacting the polybasic acid and the polyol in a molar ratio of 2.5:1 to 1:2.5, preferably in a molar ratio of 2.3:1 to 1:2.3 and more preferably in a molar ratio of 2:1 to 1:2. The molar ratio of the polybasic acid and the polyol being outside the above-mentioned range in the reaction may cause a smell due to unreacted monomers, or may cause coating defects.

A method for preparing the polyester resin may include methods well known in the art such as a method of esterifying a polybasic acid and a polyol, and then polymerization condensing the result, a method of esterifying a polybasic acid anhydride and a polyol, and then condensation polymerizing the result, or the like.

Specifically, the methods may be performed including (1) a step of raw material mixing that obtains a raw material mixture by mixing polymerization raw materials for polyester polymerization, (2) a step of esterification that esterifies the raw material mixture and (3) a step of polymerization condensation that obtains polyester by polymerization condensing the esterified raw material mixture.

Meanwhile, the polyester-based resin of the present specification prepared through such a method includes a repeating unit represented by the following [Chemical Formula 1];

[Chemical Formula 1]

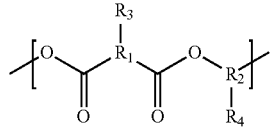

In [Chemical Formula 1], $R_1$ and $R_2$ are the same as or different from each other, and each independently a substituted or unsubstituted $C_{1-20}$ alkylene group, a substituted or unsubstituted $C_{6-20}$ arylene group, or a substituted or unsubstituted $C_{5-20}$ cycloalkylene group, $R_3$ and $R_4$ are the same as or different from each other with at least one thereof being a carboxyl group, a hydroxyl group or a sulfonate group, and are each independently hydrogen, a carboxyl group, a hydroxyl group, a sulfonate group, a substituted or unsubstituted $C_{1-20}$ alkyl group, a substituted or unsubstituted $C_{6-20}$ aryl group, or a substituted or unsubstituted $C_{5-20}$ cycloalkyl group. Herein, $R_3$ or $R_4$ is particularly preferably a carboxyl group or a sulfonate group.

More preferably, the polyester resin used in the present specification may include a repeating unit represented by the following [Chemical Formula 2].

[Chemical Formula 2]

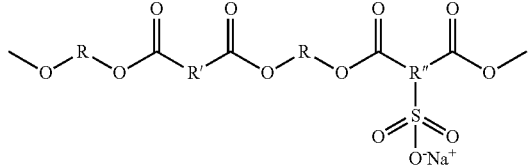

In [Chemical Formula 2], R, R' and R" are each independently a substituted or unsubstituted $C_{1-20}$ alkylene group, a substituted or unsubstituted $C_{6-20}$ arylene group, or a substituted or unsubstituted $C_{5-20}$ cycloalkylene group.

Meanwhile, the polyester resin may further include additional components in addition to the above-mentioned components within the range of not inhibiting properties of the present specification.

The polyurethane-based resin means a resin including a urethane repeating unit formed by a reaction of an isocyanate and a polyol on the main chain, and herein, the isocyanate is a compound having two or more NCO groups, and the polyol is a compound including two or more hydroxyl groups. Examples thereof may include polyester-based polyols, polycarbonate-based polyols, polyether polyols and the like, but are not limited thereto.

Specifically, examples of the isocyanate may include toluene diisocyanate (TDI), 4,4-diphenylmethane diisocyanate (MDI), 1,5-naphthalene diisocyanate (NDI), tolidine diisocyanate (TODI), hexamethylene diisocyanate (HMDI), isophorone diisocyanate (IPDI), p-phenylene diisocyanate, transcyclohexane, 1,4-diisocyanate, xylene diisocyanate (XDI) and the like, but are not limited thereto, but are not limited thereto, and may include, one, two or more types thereof.

The polyester-based polyol may be obtained by reacting a polybasic acid component and a polyol component, and herein, examples of the polybasic acid component may include aromatic dicarboxylic acids such as ortho-phthalic acid, isophthalic acid, terephthalic acid, 1,4-naphthalenedicarboxylic acid, 2,5-naphthalenedicarboxylic acid, 2,6-naphthalenedicarboxylic acid, biphenyldicarboxylic acid or tetrahydrophthalic acid; aliphatic dicarboxylic acids such as oxalic acid, succinic acid, malonic acid, glutaric acid, adipic acid, pimellic acid, suberic acid, azelaic acid, sebacic acid, linoleic acid, maleic acid, fumaric acid, mesaconic acid or itaconic acid; alicyclic dicarboxylic acids such as hexahydrophthalic acid, tetrahydrophthalic acid, 1,3-cyclohexanedicarboxylic acid or 1,4-cyclohexanedicarboxylic acid; or reactive derivatives such as acid anhydrides, alkyl esters or acids halides thereof, but are not limited thereto, and may these may be used either alone or as a combination of two or more types.

In addition, the polycarbonate-based polyol may be obtained by reacting a polyol component and a compound having a carbonate group, and herein, examples of the compound having a carbonate group may include diphenyl carbonate, dialkyl carbonate, alkylene carbonate and the like, but are not limited thereto.

Meanwhile, the polyether polyol may be obtained by adding alkylene oxide to a polyol component through ring-opening polymerization.

The polyol component is not particularly limited as long as it has two or more hydroxyl groups in the molecule. Examples thereof preferably include at least one type selected from the group consisting of ethylene glycol, 1,2-propaonediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose and sorbitol. Among these, at least one type selected from the group consisting of polytetramethylene glycol (PTMG), polypropylene glycol (PPG) and polyethylene glycol (PEG) is particularly preferred.

Meanwhile, the polyurethane-based resin may further include other polyols or chain extenders in addition to the above-mentioned components within the range of not inhibiting properties of the present specification.

Examples of the other polyol may include polyols having 3 or more hydroxyl groups such as sorbitol, glycerin, trimethylolethane, trimethylolpropane or pentaerythritol, and the like, but are not limited thereto.

Examples of the other chain extender may include glycols such as ethylene glycol, diethylene glycol, triethylene glycol, 1,3-propanediol, 1,3-butanediol, 1,4-butanediol, neopentyl glycol, pentanediol, 1,6-hexanediol or propylene glycol, and the like, but are not limited thereto.

Meanwhile, the polyurethane-based resin may further include a neutralizing agent as necessary. When including a neutralizing agent, stability of the urethane resin in the water is enhanced. Examples of the neutralizing agent may include one, two or more types selected from the group consisting of ammonia N-methylmorpholine, triethylamine, dimethylethanolamine, methyldiethanolamine, triethanolalkyne, morpholine, tripropylamine, ethanolamine and triisopropanolamine.

The polyurethane-based resin is preferably prepared in an organic solvent inert to an isocyanate and having compatibility for water. The corresponding organic solvent may include one, two or more types selected from the group consisting of ester-based solvents such as ethyl acetate or ethyl cellosolve acetate; ketone-based solvents such as acetone, methyl ethyl ketone or methyl isobutyl ketone; and ether-based solvents such as dioxane or tetrahydrofuran.

In addition, the polyurethane-based resin of the present specification may be prepared through a one-shot method, a multi-stage method and the like well-known in the art. Specifically, a one-shot method is a method reacting each of the components at once, and a multi-stage method is a method reacting each of the components in stages. In addition, a urethane reaction catalyst may be further included when preparing the polyurethane-based resin.

Meanwhile, in terms of dispersibility and transparency, the polyurethane resin is particularly preferably, but not limited to, a carbonate-based polyurethane resin using a polycarbonate-based polyol as a reactant or an ester-based polyurethane resin using a polyester-based polyol as a reactant.

In addition, the weight average molecular weight of the polyurethane-based resin is preferably from 10,000 to 1,000,000. The weight average molecular weight of the polyurethane-based resin satisfying the above-mentioned range is effective in obtaining sufficient adhesive strength and excellent water dispersibility.

According to one embodiment of the present specification, the polyurethane-based resin preferably includes one or more types of functional groups selected from the group consisting of a carboxyl group, a hydroxyl group, a sulfonate group, and a tertiary amine group. When the polyurethane-based resin includes the above-mentioned functional groups, adhesive strength for an adhesive layer and water dispersibility are greatly enhanced. Meanwhile, the polyurethane-based resin including such a functional group may be prepared using compounds including the functional groups as a polyol and/or an isocyanate, or using a method of adding a chain extender including the functional groups when a polyol and an isocyanate react. For example, the polyurethane-based resin including a carboxyl group or a tertiary amine group may be prepared by adding and reacting a chain extender having a free carboxyl group or a free amine group when a polyester polyol and an isocyanate react. Herein, examples of the chain extender having a free carboxyl group may include dihydroxy carboxylic acid, dihydroxy succinic acid and the like, but are not limited thereto. Examples of the dihydroxy carboxylic acid may include one, two or more types selected from the group consisting of dialkylol alkanoic acid including dimethylol alkanoic acid such as dimethylol acetic acid, dimethylol butanoic acid, dimethylol propionic acid, dimethylol butyric acid and dimethylol pentanoic acid.

Meanwhile, examples of the chain extender having a free amine group may include aliphatic diamines such as ethylenediamine, propylenediamine, hexamethylenediamine, 1,4-butanediamine and aminoethylethanolamine; alicyclic diamines such as isophorone diamine and 4,4'-dicyclohexylmethanediamine; and aromatic diamines such as xylylenediamine and tolylenediamine, and the like, but are not limited thereto, and may include one, two or more types selected from the group consisting of these.

Meanwhile, the polyurethane resin may further include additional components in addition to the above-mentioned components within the range of not inhibiting properties of the present specification.

In addition, according to one embodiment of the present specification, the composition may further include water dispersible fine particles and an aqueous crosslinking agent.

According to one embodiment of the present specification, the water dispersible fine particles include one or more types selected from the group consisting of silica, titania, alumina, zirconia and antimony-based fine particles.

In addition, in the composition according to the present specification, the water dispersible fine particles are preferably silica. Silica has more superior blocking inhibition ability and has excellent transparency thereby hardly produces haze, and there is no coloration as well, and accordingly, influences on the optical properties of a polarizing plate are smaller. In addition, colloidal silica has favorable dispersibility and dispersion stability for the composition, and therefore, workability is more superior when forming a coating layer.

Meanwhile, the water-dispersible fine particles preferably have an average diameter (average first particle diameter) of approximately 50 nm to 500 nm. When the average diameter of the water-dispersible fine particles is less than 50 nm, surface energy increases causing aggregation and precipitation of the water-dispersible particles in the coating composition, which may inhibit solution stability, and when the average diameter is greater than 500 nm, the water-dispersible particles are not uniformly dispersed in the coating composition, and as the particles aggregate, the sizes become greater than visible light (400 nm to 800 nm) wavelengths scattering light having a wavelength of 400 nm or greater, and as a result, haze increases. Accordingly, by using fine particles having an average diameter in the above-mentioned range, unevenness is properly formed on the coating layer surface, therefore, friction at the contact surface between the acryl-based film and the coating layer, or between the coating layers is effectively reduced. As a result, the blocking inhibition ability may be more enhanced.

The composition of the present specification is water-based, and therefore, the fine particles are mixed as water dispersion. Specifically, when employing silica as the fine particles, the silica is preferably mixed as colloidal silica. As the colloidal silica, commercially available products in the art may be used as they are, and examples thereof may include SNOWTEX series manufactured by Nissan Chemical Industries, Ltd., AEROSIL series manufactured by Air Products, EPOSTAR series and SOLIOSTAR RA series manufactured by Nippon Shokubai Co. Ltd., LSH series manufactured by Ranco, and the like.

The water dispersible fine particle content is from 0.01 parts by weight to 30 parts by weight, preferably from 0.01 parts by weight to 20 parts by weight and more preferably from 0.01 parts by weight to 10 parts by weight with respect to 100 parts by weight of the polymer resin. When the water dispersible fine particle content satisfies the above-mentioned numerical range, slip between films favorably occurs when winding, a winding property is improved due to an enhanced anti-blocking property, and percentage defection of the film is significantly improved after winding. In addition, scratch resistance is enhanced, and film transparency is excellent due to a low Haze value.

According to one embodiment of the present specification, the aqueous crosslinking agent may include one or more types selected from the group consisting of oxazoline-based crosslinking agents, organosilane-based crosslinking agents, blocked isocyanate-based crosslinking agents, carbodiimide-based crosslinking agents, organotitanate-based crosslinking agents, organozirconate-based crosslinking agents, epoxy-based crosslinking agents, dihydrazide-based crosslinking agents and melamine-based crosslinking agents. The aqueous crosslinking agent is useful since it is dissociated or reacts at a certain temperature or higher and capable of being used as a one component coating agent.

Specifically, the aqueous crosslinking agent content is from 0.01 parts by weight to 20 parts by weight and more preferably from 0.01 parts by weight to 10 parts by weight with respect to 100 parts by weight of the polymer resin. When the crosslinking agent content is less than 0.01 parts by weight with respect to 100 parts by weight of the polymer resin, an effect of improving solvent resistance is not obtained, and when the content is greater than 20 parts by weight, a coating property becomes poor significantly reducing workability, and storage stability is reduced.

In addition, the composition may further include other additives in addition to the water dispersible fine particles and the aqueous crosslinking agent. Examples thereof may include a surfactant, an antistatic agent, an antioxidant, an ultraviolet absorbent, an antifoaming agent, a dispersion agent, a dispersion stabilizer, a viscosity agent, a preservative and the like.

According to one embodiment of the present specification, the coating layer has a thickness of 50 nm to 1000 nm. Specifically, the coating layer has a thickness of 150 nm to 800 nm. When the coating layer thickness satisfies the above-mentioned numerical range, adhesiveness, an attachment property and durability are excellent.

In addition, a coefficient of friction of the coating layer is, for example, from 0 to 0.6, but is not limited thereto. As the coefficient of friction of the coating layer decreases, a slip property becomes superior, and when the coefficient of friction satisfies the above-mentioned numerical range, a winding property is excellent. Herein, the coefficient of friction means a relative ratio dividing frictional force by normal force.

In addition, in the present specification, the coating layer may have transparency (haze) of 0 to 5 or 0.1 to 3. It is favorable as the coating layer transparency decreases, and when the transparency satisfies the above-mentioned numerical range, film transparency is excellent.

The transparent film has a structure of a single layer or a structure of laminating two or more layers of films, and when the transparent film has a structure of laminating two or more layers of films, the laminated films are formed with materials the same as of different from each other.

The transparent film may be an acryl-based film. Herein, the acryl-based film means a film having a resin including an acrylate-based unit or a methacrylate-based unit as a main component, and the concept includes a film having not only a homopolymer resin formed with an acrylate-based unit or a methacrylate-based unit but also a copolymer resin having other monomer units copolymerized in addition to an acrylate-based unit and/or a methacrylate-based unit as a main component, and also includes a film formed by a blend resin having other resins blended to the acrylic resin such as above.

Herein, the acryl-based film may be, for example, a film including a copolymer including an alkyl (meth)acrylate-based unit and a styrene-based unit; and an aromatic-based resin having a carbonate portion on the main chain, a film including an alkyl (meth)acrylate-based unit and a 3- to 6-membered heteroring unit substituted with at least one carbonyl group, or a film including an alkyl (meth)acrylate-based unit, a styrene-based unit, a 3- to 6-membered heteroring unit substituted with at least one carbonyl group and a vinyl cyanide unit, or an acryl-based film having a lactone structure, but is not limited thereto.

A monomer unit capable of being copolymerized to the acryl-based resin may include an aromatic vinyl-based unit, a 3- to 6-membered heteroring unit substituted with a carbonyl group, an acrylic acid unit, a glycidyl unit and the like. Herein, the aromatic vinyl-based unit refers to, for example, a unit derived from styrene, α-methylstyrene and the like, and the 3- to 6-membered heteroring unit substituted with a carbonyl group refers to, for example, a unit derived from a lactone ring, glutaric anhydride, glutarimide, maleimide, maleic anhydride and the like.

For example, the acryl-based film is a film including a copolymer including an alkyl (meth)acrylate-based unit and a 3- to 10-membered heteroring unit substituted with at least one carbonyl group. Herein, the 3- to 10-membered heteroring unit substituted with a carbonyl group is a lactone ring, glutaric anhydride, glutarimide, maleic anhydride, maleimide and the like.

Another example of the acryl-based film includes a film including a blend resin blending an aromatic resin having a carbonate portion on the main chain to an acrylic resin. Herein, examples of the aromatic resin having a carbonate unit on the main chain include a polycarbonate resin, a phenoxy resin and the like.

A method for preparing the acryl-based resin film is not particularly limited, and for example, the acryl-based resin film is prepared by preparing a thermoplastic resin composition by sufficiently mixing an acryl-based resin, other polymers, additives and the like using any suitable mixing method, and then film molding the result, or the acryl-based resin film is prepared by preparing an acryl-based resin, other polymers, additives and the like as separate solutions, then forming a uniformly mixed solution by mixing the separately prepared solutions, and film molding the result.

The thermoplastic resin composition may be prepared by, for example, pre-blending the film raw materials using any suitable mixer such as an omni mixer, and then extrusion kneading the obtained mixture. In this case, the mixer used in the extrusion kneading is not particularly limited, and for example, any suitable mixer including an extruder such as a monoaxial extruder and a biaxial extruder, a pressurized kneader, and the like, is used.

Examples of the film molding method include a solution casting method, a melting extrusion method, a calendar method, an extrusion molding method and the like. Among these film molding methods, a solution casting method and a melting extrusion method are preferred.

Examples of a solvent used in the solution casting method may include aromatic hydrocarbons such as benzene, toluene and xylene; aliphatic hydrocarbons such as cyclohexane and decaline; esters such as ethyl acetate and butyl acetate; ketones such as acetone, methyl ethyl ketone and methyl isobutyl ketone; alcohols such as methanol, ethanol, isopropanol, butanol, isobutanol, methyl cellosolve, ethyl cellosolve and butyl cellosolve; ethers such as tetrahydrofuran and dioxane; halogenated hydrocarbons such as dichloromethane, chloroform and carbon tetrachloride; dimethylformamide; dimethyl sulfoxide, and the like, but are not limited thereto, and may include one or two types selected from the group consisting of these.

Examples of a device used for performing the solution casting method include a drum-type casting machine, a band-type casting machine, a spin coater and the like. Examples of the melting extrusion method include a T die method, an inflation method and the like. The molding temperature is preferably from 150° C. to 350° C., and more preferably from 200° C. to 300° C.

When a film is molded using the T die method, a film having a roll shape is prepared by mounting a T die at the front end of a known monoaxial extruder or a biaxial extruder, and winding the film extruded to a film shape. Herein, the film may be monoaxially oriented by applying orientation in the extrusion direction by properly adjusting the temperature of a winding roll, or the film may be simultaneously biaxially oriented, sequential biaxially oriented and the like by orienting the film in the perpendicular direction to the extrusion direction.

The acryl-based film is an unoriented film or an oriented film. When the acryl-based film is an oriented film, it is either a monoaxially oriented film or a biaxially oriented film, and when the acryl-based film is a biaxially oriented film, it is either a simultaneous biaxially oriented film or a sequential biaxially oriented film. Film performance is improved when the film is biaxially oriented since mechanical strength is improved. By mixing the acryl-based film with other thermoplastic resins, an increase in the phase difference may be suppressed even when the film is oriented, and optical isotropy may be maintained.

The orientation temperature is preferably in a range near a glass transition temperature of a thermoplastic resin composition, a film raw material, and is preferably in a range of (glass transition temperature−30° C.) to (glass transition temperature+100° C.), and more preferably in a range of (glass transition temperature−20° C.) to (glass transition temperature+80° C.). When the orientation temperature is less than (glass transition temperature−30° C.), a sufficient degree of orientation is not obtained. On the contrary, when the orientation temperature is greater than (glass transition temperature+100° C.), the flow of the resin composition occurs, and stable orientation is not carried out.

The degree of orientation defined by an area ratio is preferably from 1.1 times to 25 times, and more preferably from 1.3 times to 10 times. The degree of orientation being less than 1.1 times does not lead to improvement in toughness, which accompanies orientation. When the degree of orientation is greater than 25 times, as much effects as the increased degree of orientation may not be obtained.

The orientation rate is preferably from 10%/min to 20,000%/min in one direction, and more preferably from 100%/min to 10,000%/min. When the orientation rate is less than 10%/min, manufacturing costs increase since relatively a long period time is required to obtain sufficient degree of orientation. When the orientation rate is greater than 20,000%/min, the oriented film breaks and the like.

Heat treatment (annealing) and the like may be carried out on the acryl-based film after orientation in order for stabilizing optical isotropy or mechanical properties of the film.

In the acryl-based film according to the present specification, surface treatment may be carried out on at least one surface of the acryl-based film before and after forming the coating layer in order for enhancing adhesive strength with an adhesive or attachment strength with the coating layer, and herein, the surface treatment method may include one or more types selected from the group consisting of alkali treatment, corona treatment and plasma treatment.

Meanwhile, the optical film according to the present specification may selectively further include a coating layer on at least one surface of the coating layer-formed transparent film. The coating layer is an anti-glare layer, a hard coating layer, an anti-reflection layer, an ultraviolet blocking layer, an antistatic layer, a contamination tolerant prevention layer, an adhesive layer, or the like.

Such an optical film of the present specification may be useful as a protective film for a polarizing plate. More specifically, the polarizing plate of the present specification includes a polarizer, and the optical film according to the present specification disposed on at least one surface of the polarizer.

Herein, the polarizer is not particularly limited, and polarizers well known in the art such as films formed with polyvinyl alcohol (PVA) including iodine or dichroic dyes are used. In the present specification, the polarizer means a state without including a protective film (transparent film), and the polarizing plate means a state including a protective film (transparent film).

Meanwhile, the polarizing plate according to the present specification may further include an adhesive layer on one surface or both surface of the polarizer in order to attach the polarizer and the optical film. For example, the polarizing plate of the present specification may have a structure of one surface being formed with [transparent film/coating layer/adhesive layer/polarizer] based on the polarizer, however, the structure is not limited thereto. Herein, the adhesive capable of being used in forming the adhesive layer may be aqueous or non-aqueous adhesives generally used in the art, and as the non-aqueous adhesive, cation-based adhesives or radical-based adhesives may be used, although not particularly limited thereto.

The aqueous adhesive is dissolving or dispersing an adhesive component in water. Examples of the preferably used aqueous adhesive includes an adhesive composition using a polyvinyl alcohol-based resin or a urethane resin as a main component.

When using a polyvinyl alcohol-based resin as a main component of the aqueous adhesive, the polyvinyl alcohol-based resin may also be a modified polyvinyl alcohol-based resin such as a carboxyl group-modified polyvinyl alcohol, an acetoacetyl group-modified polyvinyl alcohol, a methylol group-modified polyvinyl alcohol or an amino group-modified polyvinyl alcohol in addition to a partially saponified polyvinyl alcohol and a completely saponified polyvinyl alcohol. The polyvinyl alcohol-based resin may also be a polyvinyl alcohol-based copolymer obtained by saponifying a copolymer of vinyl acetate and other monomers copolymerizable therewith, in addition to a vinyl alcohol homopolymer obtained by saponifying polyvinyl acetate, a homopolymer of vinyl acetate.

The aqueous adhesive having the polyvinyl alcohol-based resin as an adhesive component is commonly an aqueous solution of the polyvinyl alcohol-based resin. The concentration of the polyvinyl alcohol-based resin in the adhesive is commonly from 1 parts by weight to 10 parts by weight and preferably from 1 parts by weight to 5 parts by weight with respect to 100 parts by weight of water.

To the adhesive formed with an aqueous solution of the polyvinyl alcohol-based resin, a curing component or a crosslinking agent such as multivalent aldehyde, a melamine-based compound, a titanium compound, a zirconium compound, a zinc compound, glyoxal, a glyoxylic acid compound or a water-soluble epoxy resin is preferably added in order to enhance adhesiveness. The added amount of this curing component or crosslinking agent (the sum when added together as a curing component and a crosslinking agent) is commonly from 1 parts by weight to 100 parts by weight and preferably from 1 parts by weight to 50 parts by weight with respect to 100 parts by weight of the polyvinyl alcohol-based resin. When the added amount of the curing component or the crosslinking agent is less than 1 parts by weight with respect to 100 parts by weight of the polyvinyl alcohol-based resin, an effect of enhancing adhesiveness tends to be reduced, and when the added amount of the curing component or the crosslinking agent is greater than 100 parts by weight with respect to 100 parts by weight of the polyvinyl alcohol-based, the adhesive layer tends to be vulnerable.

In addition, when using a urethane resin as a main component of the adhesive, examples of a proper adhesive composition may include a mixture of a polyester-based ionomer-type urethane resin and a compound having a glycidyloxy group. The polyester-based ionomer-type urethane resin is a urethane resin having a polyester skeleton, and has a small amount of an ionic component (hydrophilic component) introduced thereto. Such an ionomer-type urethane resin is directly emulsified in the water to become an emulsion without using an emulsifier, and therefore, is suited as an aqueous adhesive.

Herein, adhesion between the polarizer and the optical film using the aqueous adhesive may be carried out by first coating the adhesive on a surface of the optical film or a PVA film that is the polarizer using a roll coater, a gravure coater, a bar coater, a knife coater, a capillary coater or the like, and laminating the protective film and the polarizer through heat press or room temperature press using a laminating roll before completely drying the adhesive. When using a hot melt-type adhesive, a heat press roll needs to be used.

Types of the non-aqueous adhesive may include cationic adhesives or radical-based adhesives. The cationic adhesive uses a photocation polymerization reaction, and although not particularly limited thereto, may mean including (a) an epoxy compound having a homopolymer glass transition temperature of 120° C. or higher, (b) an epoxy compound having a homopolymer glass transition temperature of 60° C. or lower, (c) an oxetane-based compound and (d) a cationic initiator, may mean further including an acrylate-based compound, and more specifically, may mean further including a radical-based initiator.

In addition, the (a) epoxy compound having a homopolymer glass transition temperature of 120° C. or higher may be one or more selected from the group consisting of compounds represented by the following Chemical Formulae 4 to 7 including an alicyclic epoxy compound structure represented by the following Chemical Formula 3.

[Chemical Formula 3]

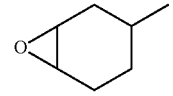

[Chemical Formula 4]

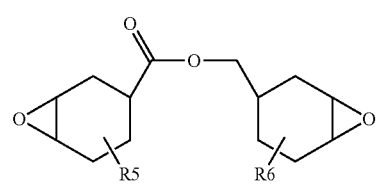

R5 and R6 each independently represent hydrogen or an alkyl group.

[Chemical Formula 5]

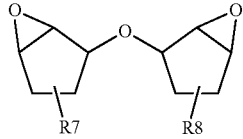

R7 and R8 each independently represent hydrogen or an alkyl group.

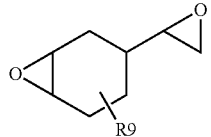

[Chemical Formula 6]

R9 represents hydrogen or an alkyl group.

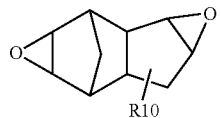

[Chemical Formula 7]

R10 represents hydrogen or an alkyl group.

However, in Chemical Formula 4 to Chemical Formula 7, the alkyl group is a linear, branched or cyclic substituted or unsubstituted alkyl group having 1 to 20 carbon atoms, and substituents that may substitute the alkyl group include an alkyl group, an alkoxy group, an alkenyl group, an epoxy group, a cyano group, a carboxyl group, an acryloyl group, a methacryloyl group, an acryloyloxy group, a methacryloyloxy group or an aryl group.

In addition, the (b) epoxy compound having a homopolymer glass transition temperature of 60° C. or lower may be one or more selected from the group consisting of polyglycidyl ether of an aliphatic multivalent alcohol; polyglycidyl ether of an alkylene oxide adduct of an aliphatic multivalent alcohol; polyglycidyl ether of a polyester polyol of an aliphatic multivalent alcohol and an aliphatic multivalent carboxylic acid; polyglycidyl ether of an aliphatic multivalent carboxylic acid; polyglycidyl ether of a polyester polycarboxylic acid of an aliphatic multivalent alcohol and an aliphatic multivalent carboxylic acid; dimers, oligomers or polymers obtained by vinyl polymerization of glycidyl acrylate or glycidyl methacrylate; and oligomers or polymers obtained by vinyl polymerization of glycidyl acrylate or glycidyl methacrylate and other vinyl-based monomers.

The (c) oxetane-based compound is not particularly limited in the type as long as it is a derivative including an oxetane group capable of cation polymerization, but may include compounds obtained through a reaction between 3-ethyl-3-(hydroxymethyl)oxetane and one or more selected from the group consisting of m-tetramethyl-xylene diisocyanate, azelaoyl chloride, terephthaloyl chloride and 1,3, 5-benzene-tricarbonyl trichloride.

The (d) cationic initiator is a compound producing cation species or Lewis acid through active energy ray irradiation, and although not particularly limited thereto, may include onium salts such as aromatic diazonium salts, aromatic iodine aluminum salts aromatic sulfonium salts, iron-arene complexes, and the like.

In addition, the acrylate-based compound is not particularly limited as long as it is a compound including an acrylate group, and may be one or more selected from the group consisting of dimethylol tricyclodecane diacrylate, (trishydroxyethyl isocyanurate)diacrylate, 9,9-bis[4-(2-acrylooxyethoxy)phenyl]fluorene, hydroxypivaldehyde-modified trimethylolpropane diacrylate, (trishydroxyethyl isocyanurate)triacrylate, trimethylpropane triacrylate, pentaerythritol triacrylate, dimethylolpropane tetratriacrylate, dipentaerythritol hexaacrylate and ditrimethylolpropane tetraacrylate. In addition, as the radical initiator, radical initiators generally used in the art may be used without limit, and examples thereof may include one or more selected from the group consisting of 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoyl formate, oxy-phenyl-acetic acid-2-[2-oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl) phenyl]-1-butanone, 2-methyl-1-[4-(methylthio)phenyl]-2-(4-morpholinyl)-1-propanone, diphenyl (2,4,6-trimethylbenzoyl)-phosphine oxide and phenylbis(2,4,6-trimethylbenzoyl)phosphine oxide.

The radical-based adhesive is an adhesive using a radical initiation reaction, and although not particularly limited in the type, may include a compound represented by the following Chemical Formula 8, a vinyl ether-based compound, a carboxylic acid compound including at least one or more unsaturated double bonds, and a radical initiator.

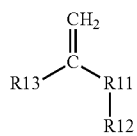

[Chemical Formula 8]

R11 is an ester group or an ether group, R12 is an alkyl group having 1 to 10 carbon atoms with at least one or more hydroxy substituents, or a cycloalkyl group having 4 to 10 carbon atoms with at least one or more hydroxy substituents, and R13 is hydrogen or an alkyl group having 1 to 10 carbon atoms.

The vinyl ether-based compound may be one or more selected from the group consisting of ethylene glycol monovinyl ether, 1,4-butanol vinyl ether, di(ethylene glycol) divinyl ether, tri(ethylene glycol)divinyl ether, tert-butyl vinyl ether, 1-(vinyloxy)-2,2-bis((vinyloxy)methyl)butane, 1,3-bis(vinyloxy)-2,2-bis((vinyloxy)methyl)propane and cyclohexyl vinyl ether.

The carboxylic acid compound including at least one or more unsaturated double bonds may be one or more selected from the group consisting of maleic acid, fumaric acid, angelic acid and tiglic acid.

The radical initiator is for enhancing a curing rate by facilitating radical polymerizability. Herein, as the radical initiator, radical initiators generally used in the art may be used without limit, and examples thereof may include one or more selected from the group consisting of 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoyl formate, oxy-phenyl-acetic acid-2-[2-oxo-2-phenylacetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide and phenylbis(2,4,6-trimethylbenzoyl)phosphine oxide.

Herein, adhesion between the polarizer and the optical film using the non-aqueous adhesive may be carried out by first coating the adhesive on a surface of the optical film or a PVA film that is the polarizer using a roll coater, a gravure coater, a bar coater, a knife coater, a capillary coater or the like, and laminating the protective film and the polarizer, and then curing the adhesive composition through light irradiation.

Such a polarizing plate according to the present specification has excellent adhesive strength with an adhesive layer and a surface coating layer, also has excellent slip and anti-blocking properties, and also has excellent water resistance.

Furthermore, the polarizing plate according to the present specification prepared as above may be used in various applications. Specifically, the polarizing plate may be preferably used in image display devices including a polarizing plate for a liquid crystal display device (LCD), a polarizing plate for anti-reflection of an organic EL display device, or the like. In addition, the polarizing plate according to the present specification may be used in complex polarizing plates combining various functional films, for example, various optical layers such as a retardation plate such as a $\lambda/4$ plate or a $\lambda/2$ plate, a light diffusion plate, a viewing angle widening plate, a luminance enhancing plate or a reflecting plate.

Hereinafter, the present specification will be described in detail in order to specifically describe the present specification. However, embodiments according to the present specification may be modified to various different forms, and the scope of the present specification is not construed as being limited to the examples described below. Examples of the present specification are provided in order to more fully describe the present specification to those having average knowledge in the art.

1. Synthesis of Polyester Resin A

A 500 ml round bottom flask was substituted with nitrogen, and ethylene glycol, diethylene glycol, sodium sulfonyl isophthalic acid and isophthalic acid were introduced thereto in a molar ratio of 0.5:0.5:0.1:0.9, and an esterification reaction was progressed for 2 hours at 200° C. to discharge a theoretical amount of water.

Tetramethyl titanate, antimony acetate and t-butyltin oxide were used as a catalyst, and trimethyl phosphate was added as a stabilizer to continuously discharge water, and then a condensation polymerization reaction was carried out for 150 minutes at 255° C. under a reduced pressure of 2.5 torr or lower to prepare polyester resin A. Total solid except water was 30% in the resin, a glass transition temperature was 60° C., and a minimum film-forming temperature was 90° C.

2. Synthesis of Polyester Acrylic Resin B

Glycidylethyl (meth)acrylate and methyl (meth)acrylate were introduced to the polyester resin A in a weight ratio of 40:60. The result was cooled, then a reactant and a thermal initiator were introduced thereto while stirring the result at a high speed in water, and the temperature was raised to 80° C. to prepare polyester acrylic resin B for 2 hours. The weight ratio of the polyester and the acryl was 5:5. Total solid except water was 30% in the resin, a glass transition temperature was 60° C., and a minimum film-forming temperature was 80° C.

3. Synthesis of Polyester Acrylic Resin C

A 500 ml round bottom flask was substituted with nitrogen, and ethylene glycol, sodium sulfonyl isophthalic acid and isophthalic acid were introduced thereto in a molar ratio of 1.0:0.1:0.9, and an esterification reaction was progressed for 2 hours at 200° C. to discharge a theoretical amount of water.

Tetramethyl titanate, antimony acetate and t-butyltin oxide were used as a catalyst, and trimethyl phosphate was added as a stabilizer to continuously discharge water, and then a condensation polymerization reaction was carried out for 50 minutes under a reduced pressure of 2.5 torr or lower. After that, glycidylethyl (meth)acrylate and methyl (meth) acrylate were introduced thereto in a weight ratio of 40:60. The result was cooled, then a reactant and a thermal initiator were introduced thereto while stirring the result at a high speed in water, and the temperature was raised to 80° C. to prepare polyester acrylic resin C for 2 hours. Total solid except water was 30% in the resin, and a weight ratio between the polyester and the acryl was 5:5. A glass transition temperature was 65° C., and a minimum film-forming temperature was 80° C.

4. Synthesis of Polyurethane Resin D

To 48 g of polycarbonate diol (Asahi Kasei, molecular weight 2000), 60 g of methyl ethyl ketone was added and dissolved by sufficiently stirring the result, and after adding 40 g of isophorone diisocyanate thereto, the result was reacted for 1 hour at 75° C. After terminating the reaction, the result was cooled to 60° C., 12 g of dimethylol propionic acid was added thereto, and the result was reacted at 75° C. to obtain a prepolymer solution. Next, this prepolymer solution was cooled to 40° C., 233 g of water was added thereto, and the result was stirred at a high speed using a homomixer to perform emulsification. Then, the result was neutralized with triethylamine and chain extended with isophorone diamine, and this emulsion was heated under reduced pressure to remove methyl ethyl ketone to obtain an aqueous polyurethane resin D solution. Total solid except water was 30% in the resin, a glass transition temperature was 30° C., and a minimum film-forming temperature was 0° C.

5. Synthesis of Polyurethane Resin E

A 500 ml round bottom flask was substituted with nitrogen, and ethylene glycol, 2-methyl-1,3-propanediol, adipic acid and isophthalic acid were introduced thereto in a molar ratio of 0.5:0.5:0.5:0.5, and an esterification reaction was progressed for 2 hours at 200° C. to discharge a theoretical amount of water.

Tetramethyl titanate, antimony acetate and t-butyltin oxide were used as a catalyst, and trimethyl phosphate was added as a stabilizer to continuously discharge water, and then a condensation polymerization reaction was carried out for 150 minutes at 255° C. under a reduced pressure of 2.5 torr or lower to prepare a polyester resin. After that, to 48 g of the polyester resin, 60 g of methyl ethyl ketone was added and dissolved by sufficiently stirring the result, and after adding 40 g of isophorone diisocyanate thereto, the result was reacted for 1 hour at 75° C. After terminating the reaction, the result was cooled to 60° C., 12 g of dimethylol propionic acid was added thereto, and the result was reacted at 75° C. to obtain a prepolymer solution. Next, this prepolymer solution was cooled to 40° C., 233 g of water was added thereto, and the result was stirred at a high speed using a homomixer to perform emulsification. Then, the result was neutralized with triethylamine and chain extended with isophorone diamine, and this emulsion was heated under reduced pressure to remove methyl ethyl ketone to obtain an aqueous polyurethane resin E solution. Total solid except water was 30% in the resin, a glass transition temperature was 40° C., and a minimum film-forming temperature was 5° C.

As for the glass transition temperature, the water-dispersible resin as above was dried, then the temperature was raised to −30° C. to 150° C. using a differential scanning calorimetry (manufactured by DSC Mettler), and a glass transition temperature at a second run was measured. The minimum film-forming temperature was measured using a minimum film-forming temperature measuring device (manufactured by Rhopoint Instruments Limited).

A coating solution was prepared by mixing each of the synthesis examples, and commercially-available binder and fine particles described in the following [Table 1], and then stirring the result.

TABLE 1

| Category | Binder 1 Type | Parts by Weight | Binder 2 Type | parts by weight | Fine Particles Type/Parts by Weight | Water 76.9 |
|---|---|---|---|---|---|---|
| Example 1 | Polyester A | 15.6 | Polyurethane D | 6.7 | ST-ZL/0.8 | 76.9 |
| Example 2 | Polyester Acryl B | 15.6 | Polyurethane D | 6.7 | ST-ZL/0.8 | 76.9 |
| Example 3 | Polyester Acryl C | 15.6 | Polyurethane E | 6.7 | ST-ZL/0.8 | 76.9 |
| Example 4 | PESRESIN A645GH | 17.8 | CK-PUD-PF | 4.4 | ST-ZL/0.8 | 76.9 |
| Comparative Example 1 | Polyester A | 22.2 | | | ST-ZL/0.8 | 76.9 |
| Comparative Example 2 | Polyester Acryl B | 22.2 | | | ST-ZL/0.8 | 76.9 |
| Comparative Example 3 | PESRESIN A645GH | 22.2 | NEOREZ R2202 | 5.7 | ST-ZL/0.8 | 76.9 |
| Comparative Example 4 | polyurethane D | 22.2 | CK-PUD-PF | 15.6 | ST-ZL/0.8 | 76.9 |
| Comparative Example 5 | CK-PUD-PF | 22.2 | CK-PUD-PF | 0.2 | ST-ZL/0.8 | 76.9 |
| Comparative Example 6 | PESRESIN A645GH | 15.6 | | | ST-ZL/0.8 | 77.9 |
| Comparative Example 7 | PESRESIN A645GH | 6.7 | | | | 76.9 |
| Comparative Example 8 | PESRESIN A645GH | 22.0 | | | | 76.9 |

In Table 1, PESRESIN A-645GH is a trade name of a polyester acryl-based resin sold by Takamatsu oil & fat Co., Ltd., and total solid except water was 30% in the resin, a glass transition temperature was 80° C. and a minimum film-forming temperature was 80° C.

CK-PUD-PF is a trade name of a polyurethane-based resin sold by Chokwang Paint Ltd., and total solid except water was 30% in the resin, a glass transition temperature was 25° C. and a minimum film-forming temperature was 10° C.

Snowtex ST-ZL is a trade name of aqueous silica sold by Nissan chemical, and total solid except water was 40% in the resin.

Neorez R2202 is a trade name of a polyurethane-based resin sold by DSM, and total solid except water was 35% in the resin, and a minimum film-forming temperature was 81° C. (measured by DSM).

6. Preparation of Optical Film

After forming a film with an acrylic resin having a methacrylate polymer as a main component under a condition of 250° C. and 250 rpm using a T-die film-forming apparatus, the film was oriented by 1.8 times in an MD direction at 135° C., and corona treatment was carried out on one surface of the pre-coated film under a condition of 50 W/m²/min.

Next, Examples 1 to 4 and Comparative Examples 1 to 8 were each coated on one surface of the corona-treated acrylic film using a Mayer bar. Then, each of the result was oriented by 2.5 times in a TD direction at 135° C. to prepare a film having a coating layer formed on one surface. Herein, the thicknesses of the coating layers were all 300 nm.

Experimental Example 1. Evaluation of Aqueous Adhesive Strength

Lamination was performed in order of TAC/PVA device/prepared film using the films prepared in the examples and the comparative examples, and a 4% aqueous PVA adhesive was coated between each of the films, and then the result passed through a laminator after setting the condition so that the final adhesive layer has a thickness of 1 μm to 2 μm.

The result was dried for 5 minutes in a 80° C. oven to prepare a polarizing plate. The prepared polarizing plate was cut to prepare a specimen having a width of 2 cm, and peel strength when peeling off at a speed of 300 mm/min and 90 degrees was measured using a TA.XT.Plus (Stable Micro Systems) texture analyzer. The peel strength of greater than 2 N/cm was marked as excellent, the peel strength between 1.0 N/cm and 2 N/cm was marked as favorable, and the peel strength of less than 1 N/cm was marked as poor.

Experimental Example 2. Evaluation of Ultraviolet Curable Adhesive Strength

Lamination was performed in order of general acryl-based optical film/PVA device/prepared film using the films prepared through the compositions prepared in the examples and the comparative examples, and an ultraviolet curable adhesive was coated between each of the films, and then the result passed through a laminator after setting the condition so that the final adhesive layer has a thickness of 1 μm to 2 μm. Then, ultraviolet rays were irradiated on the surface having the general acryl-based optical film laminated thereon using an ultraviolet irradiator to prepare a polarizing plate. The prepared polarizing plate was cut to prepare a specimen having a width of 2 cm, and peel strength when peeling off at a speed of 300 mm/min and 90 degrees was measured using a TA.XT.Plus (Stable Micro Systems) texture analyzer.

The peel strength of greater than 2 N/cm was marked as excellent, the peel strength between 1.0 N/cm and 2 N/cm was marked as favorable, and the peel strength of less than 1 N/cm was marked as poor.

Experimental Example 3. Evaluation of High Temperature and High Humidity Durability The polarizing plate prepared in Experimental Example 2 was laminated on a glass substrate (glass lamination), and left unattended for 500 hours at a temperature of 80° C. and humidity of 90%. Then, deformations in the polarizing plate appearance were visually evaluated. The polarizing plate appearance being favorable was evaluated as OK, and the edges being completely opened or lifted was evaluated as NG.

The results are shown in the following Table 2.

TABLE 2

| Composition | Aqueous Adhesive Strength | Ultraviolet Curable Adhesive Strength | Appearance after High Temperature High Humidity Endurance |
|---|---|---|---|
| Example 1 | Excellent | Excellent | OK |
| Example 2 | Excellent | Excellent | OK |
| Example 3 | Excellent | Excellent | OK |
| Example 4 | Excellent | Excellent | OK |
| Comparative Example 1 | Poor | Favorable | NG |
| Comparative Example 2 | Poor | Excellent | NG |
| Comparative Example 3 | Favorable | Excellent | NG |
| Comparative Example 4 | Excellent | Poor | OK |
| Comparative Example 5 | Excellent | Poor | OK |
| Comparative Example 6 | Poor | Favorable | NG |
| Comparative Example 7 | Favorable | Favorable | NG |
| Comparative Example 8 | Poor | Excellent | OK |

As seen in Table 2, it was seen that, in the optical films prepared using the compositions of Examples 1 to 4 according to one embodiment of the present specification, target results were obtained in all of the aqueous adhesive strength, the ultraviolet curable adhesive strength, and the appearance after high temperature high humidity endurance.

The invention claimed is:

1. An optical film comprising:
a transparent film; and
a coating layer on at least one surface of the transparent film, the coating layer has transparency of 0 to 5 and has a coefficient of friction is from 0 to 0.6;
wherein the coating layer includes a synthesis of polyester acrylic resin in which a weight ratio of polyester and acryl is 5:5 and a polyurethane-based resin which has a weight average molecular weight from 10,000 to 1,000,000;
wherein the coating layer is formed using a composition having a synthesis of polyester acrylic resin B as the synthesis of polyester acrylic resin and a polyurethane-based resin D as the polyurethane-based resin, or the coating layer is formed using a composition having a synthesis of polyester acrylic resin C as the synthesis of polyester acrylic resin and a polyurethane-based resin E as the polyurethane-based resin;
wherein the polyester acrylic resin B has a weight ratio of polyester and acryl of 5:5, the synthesis of the polyester acrylic resin B is prepared by adding glycidylethyl (meth)acrylate and methyl (meth)acrylate, in a weight ratio of 40:60, to polyester resin A, the polyester resin A is prepared by an esterification reaction of ethylene glycol, diethylene glycol, sodium sulfonyl isophthalic acid, and isophthalic acid in a molar ratio of 0.5:0.5:0.1:0.9; the polyester acrylic resin C has a weight ratio of polyester and acryl of 5:5, the synthesis of polyester acrylic resin C is prepared by adding glycidylethyl (meth)acrylate and methyl (meth)acrylate, in a weight ratio of 40:60, to an esterification reaction product of ethylene glycol, sodium sulfonyl isophthalic acid, and isophthalic acid in a molar ratio of 1.0:0.1:0.9; the polyurethane-based resin D is prepared by dissolving 60 g of methyl ethyl ketone in 48 g of polycarbonate diol having a molecular weight of 2,000, and adding 40 g of isophorone diisocyanate, 12 g of dimethylol propionic acid, and 233 g of water to perform emulsification, then neutralizing with triethylamine and chain extending with isophorone diamine; the polyurethane-based resin E is prepared by dissolving 60 g of methyl ethyl ketone in 48 g of a polyester resin prepared by an esterification reaction of ethylene glycol, 2-methyl-1, 3-propanediol, adipic acid, and isophthalic acid in a molar ratio of 0.5:0.5:0.5:0.5, then adding 40 g of isophorone diisocyanate, 12 g of dimethylol propionic acid, and 233 g of water to perform emulsification, then neutralizing with triethylamine and chain extending with isophorone diamine;
wherein a film-forming temperature of the synthesis of polyester acrylic resin B, the synthesis of polyester acrylic resin C, the polyurethane-based resin D and the polyurethane-based resin E are 80° C., 80° C., 0° C., and 5° C., respectively; and
wherein the composition includes the synthesis of polyester acrylic resin in 70.0 parts by weight and the polyurethane-based resin in 30.0 parts by weight, with respect to a total of 100 parts by weight of the synthesis of polyester acrylic resin and the polyurethane-based resin;
wherein a glass transition temperature of the synthesis of polyester acrylic resin B, the synthesis of polyester acrylic resin C, the polyurethane-based resin D and the polyurethane-based resin E are 60° C., 65° C., 30° C. and 40° C., respectively.

2. The optical film of claim 1, wherein the coating layer has a thickness of 50 nm to 1000 nm.

3. The optical film of claim 1, wherein the transparent film is an acryl-based film.

4. A polarizing plate comprising:
a polarizer; and
the optical film of claim 1 on at least one surface of the polarizer; and
a non-aqueous adhesive layer on one surface or both surfaces of the polarizer in order to attach the polarizer and the optical film, the non-aqueous adhesive is a cationic adhesive which includes (a) an epoxy compound having a homopolymer glass transition temperature of 120° C. or higher, (b) an epoxy compound having a homopolymer glass transition temperature of 60° C. or lower, (c) an oxetane-based compound and (d) a cationic initiator.

5. The polarizing plate of claim 4, wherein the (a) epoxy compound having a homopolymer glass transition temperature of 120° C. or higher is at least one compound selected from the group consisting of compounds represented by the following Chemical Formulae 4 to 7 including an alicyclic epoxy compound structure represented by the following Chemical Formula 3;

[Chemical Formula 3]

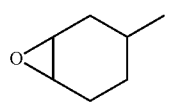

[Chemical Formula 4]

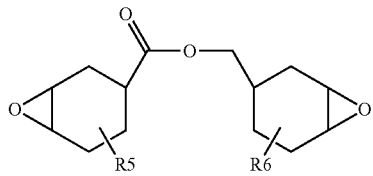

R5 and R6 each independently represent hydrogen or an alkyl group;

[Chemical Formula 5]

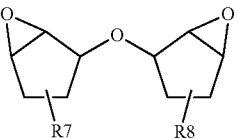

R7 and R8 each independently represent hydrogen or an alkyl group;

[Chemical Formula 6]

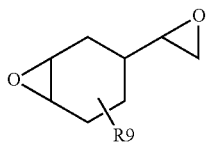

R9 represents hydrogen or an alkyl group;

[Chemical Formula 7]

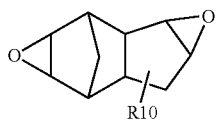

R10 represents hydrogen or an alkyl group.

* * * * *